(12) United States Patent
Schauz et al.

(10) Patent No.: US 7,131,370 B2
(45) Date of Patent: Nov. 7, 2006

(54) CENTRIFUGAL SEPARATING DEVICE AND METHOD OF CLARIFYING MUST DURING THE PRODUCTION OF WINE

(75) Inventors: Frank Schauz, Oelde (DE); Ulrich Schmid, Altbach (DE)

(73) Assignee: Westfalia Separator AG, Oelde (DE)

( * ) Notice: Subject to any disclaimer, the term of this patent is extended or adjusted under 35 U.S.C. 154(b) by 513 days.

(21) Appl. No.: 10/182,565

(22) PCT Filed: Dec. 30, 2000

(86) PCT No.: PCT/EP00/13341

§ 371 (c)(1),
(2), (4) Date: Nov. 1, 2002

(87) PCT Pub. No.: WO01/57177

PCT Pub. Date: Aug. 9, 2001

(65) Prior Publication Data

US 2004/0035296 A1  Feb. 26, 2004

(30) Foreign Application Priority Data

Feb. 4, 2000 (DE) ................................ 100 04 907

(51) Int. Cl.
*B04B 5/10* (2006.01)
*B01D 15/00* (2006.01)
*B04C 5/081* (2006.01)

(52) U.S. Cl. ............................. 99/511; 426/11; 426/12; 426/330.4; 210/202; 210/221.1; 210/221.2; 210/703; 210/704; 210/705; 210/781; 210/800; 210/803; 210/804; 210/806; 99/276; 494/42; 494/56

(58) Field of Classification Search ............. 426/330.4, 426/11–12; 210/202, 221.1, 221.2, 703–705, 210/781, 800, 803–804, 806; 494/42, 56; 99/511, 276
See application file for complete search history.

(56) References Cited

U.S. PATENT DOCUMENTS 4,094,783 A * 6/1978 Jackson ....................... 210/703
5,770,050 A * 6/1998 Trefz et al. .................. 209/170

FOREIGN PATENT DOCUMENTS

EP   0978482 A1 *  2/2000

OTHER PUBLICATIONS

*Separatoren und Dekanter in Weinkellereien*, Westfalia Separator AG (Cover sheet and p. 6).
*Clarifiers and Decanters in the Wine Industry*, Westfalia Separator Food Tec.
Jochen Hamatschek, Ernst W. Bott, Peter Schöttler, *Separatoren und Dekanter für die qualitätsbewuβte Weinbereitung*, Technisch-wissenschafliche Dokumentation Nr. 17, Erste Auflage 1992, Westalia Separator AG.
Jochen Hamatschek, Ernst W. Bott, Peter Schöttler, *Clarifiers and decanters for the production of quality wines*, Technical scientific documentation No. 17, 1$^{st}$ ed. 1992, Westfalia Separator AG.

* cited by examiner

*Primary Examiner*—Milton I. Cano
*Assistant Examiner*—Adepeju O. Pearse
(74) *Attorney, Agent, or Firm*—Barnes & Thornburg LLP

(57) ABSTRACT

The invention relates to a centrifugal separating device and method for clarifying must during wine production, especially with a separator (7). Gas and/or gelatine and/or other additives are added to the must that is clarified in the separating device after the must has passed through the separating device and before it passes through the constant pressure valve (13) of the separating device, as the must is discharged (9), in order to obtain flotation.

4 Claims, 2 Drawing Sheets

CENTRIFUGAL SEPARATING DEVICE AND METHOD OF CLARIFYING MUST DURING THE PRODUCTION OF WINE

BACKGROUND AND SUMMARY OF THE INVENTION

The invention relates to a centrifugal separating device for clarifying must in the production of wine, and to a method of clarifying must when producing wine.

The use of separators and decanters in the production of wine is described on Page 6 of the company publication with the title "Separators and Decanters Used by Wine Producers" of Westfalia Separator AG, Oelde, Germany, 1992. First, the grape mash is guided into a prejuicer. The prejuiced mash is then fed to a press. The starting product obtained in this manner will then—optionally after a sieving in a rotary brush sieve—be guided into a must tank. After the pressing, the must in the tank may also be fined, for example, by means of gelatin. After a dwell time in the tank, the must will then be guided into a clarifying separator and the clarified must is guided from the separator directly into the fermentation tank.

An analogous process is known from the additional company publication by J. Hamatschek et al. with the title "Separators and Decanters for the Quality-Aware Preparation of Wine" of Westfalia Separator AG, Oelde, Germany, 1992.

Although the above-described method of operation has been successful per se, there is demand for a further simplification and improvement of the clarification of must while the achieved quality of the wine is as good as possible. This invention addresses these problems.

The present invention is directed at a centrifugal separating device for the clarification of must in the production of wine, comprising: a discharge; a constant pressure valve; a flotation device; and wherein the constant pressure valve is connected to the discharge and the flotation device is connected to the discharge in front of the constant pressure valve. A method of clarifying must when producing wine by means of a centrifugal separating device, which device includes a discharge, a constant pressure valve, and a flotation device and wherein the constant pressure valve is connected to the discharge, and the flotation device is connected to the discharge in front of the constant pressure valve, the steps comprising: collecting must in a tank; feeding the must through a pump into a separator; clarifying the must in the separator; discharging the clarified must through a discharge line; flotating the clarified must via a flotation device by mixing the clarified must with one or more of gelatin and air; passing the flotated must through a constant pressure valve into a relaxation device.

In the present invention, when parameters are selected appropriately, on the one hand, cloudiness, which remains suspended behind the separator, is removed in a considerable quantity by flotation and, on the other hand, even solids which may be thrown off and which the separator has not separated, are floated.

Although the flotation of wine per se is naturally known, according to the prior art, flotation is used by itself for the clarification of must. In this conventional method of clarifying must, the must is pumped continuously by means of two equipment-pertaining pressure pumps by way of an input valve into a pressurized (up to 6 bar) impregnation vessel. In the forward current, gelatin and air are then continuously metered in by means of a metering pump. In the process, the must is enriched with gas. The must will then leave the pressure tank also continuously by way of the output valve. The must is guided into an intermediate vessel in which the flotation takes place so that the cloudiness rises to the liquid level. A compact amount of cloudiness is created with a large fraction of foam.

Within the scope of the present invention, it was surprisingly found to be particularly advantageous to connect a flotation device directly behind a separator or to combine the flotation device directly with a separating clarification in the centrifugal field of the separator. Directly in front of a constant pressure valve, for example, sterile air and gelatin are metered into a static mixer or are guided by way of corresponding feeding pipes directly into the discharge. In this case, a high discharge pressure of from approximately 5 to 6 bar, which is necessary for being able to dissolve oxygen in a sufficient quantity and in small bubbles in the product, can be utilized in the discharge from the separator.

The present invention therefore combines a flotation method for the clarification of must with a clarification of must in the separator.

In the present invention, the consumption of gelatin and air is approximately five times lower than in the case of conventional flotation methods because the majority of the solids were removed by the separator. Furthermore, approximately ten times less foam is formed than in the case of a flotation without a separator on the input side. A slightly fermented and cold must (approximately 10° C.), which is difficult to clarify by means of a conventional sole flotation, without any problems in the separator, can be clarified well by means of the flotation device of the present invention, preferably connected on the output side in the discharge.

Additionally, the separator can be operated at higher throughput capacities with a resulting less favorable degree of clarification because, when the flotation device is connected on the output side of the separator, the remaining cloudiness is clearly reduced again. This results in a considerable saving of time.

As a result of the fact that the high discharge pressure existing in the discharge of the separator is utilized for the flotation, there is also an advantage that no expensive pressure pumps and pressurized containers are required. The investment costs are therefore reduced.

The installation of the separator also provides the possibility of a use in the clarification of new wine, for clarification racking, for the processing of cloudiness and for the separation of tartar.

In a preferred embodiment, the flotation device is connected into the discharge of the separating device or in front of the constant pressure valve and/or comprises a proportioning device for the feeding of air and/or gelatin and/or other additives into the clarified must drained off the separating device.

Other aspects, advantages and novel features of the present invention will become apparent from the following detail description of the invention when considered in conjunction with the accompanying drawings.

DETAILED DESCRIPTION OF THE PREFERRED EMBODIMENTS

Figure 1:
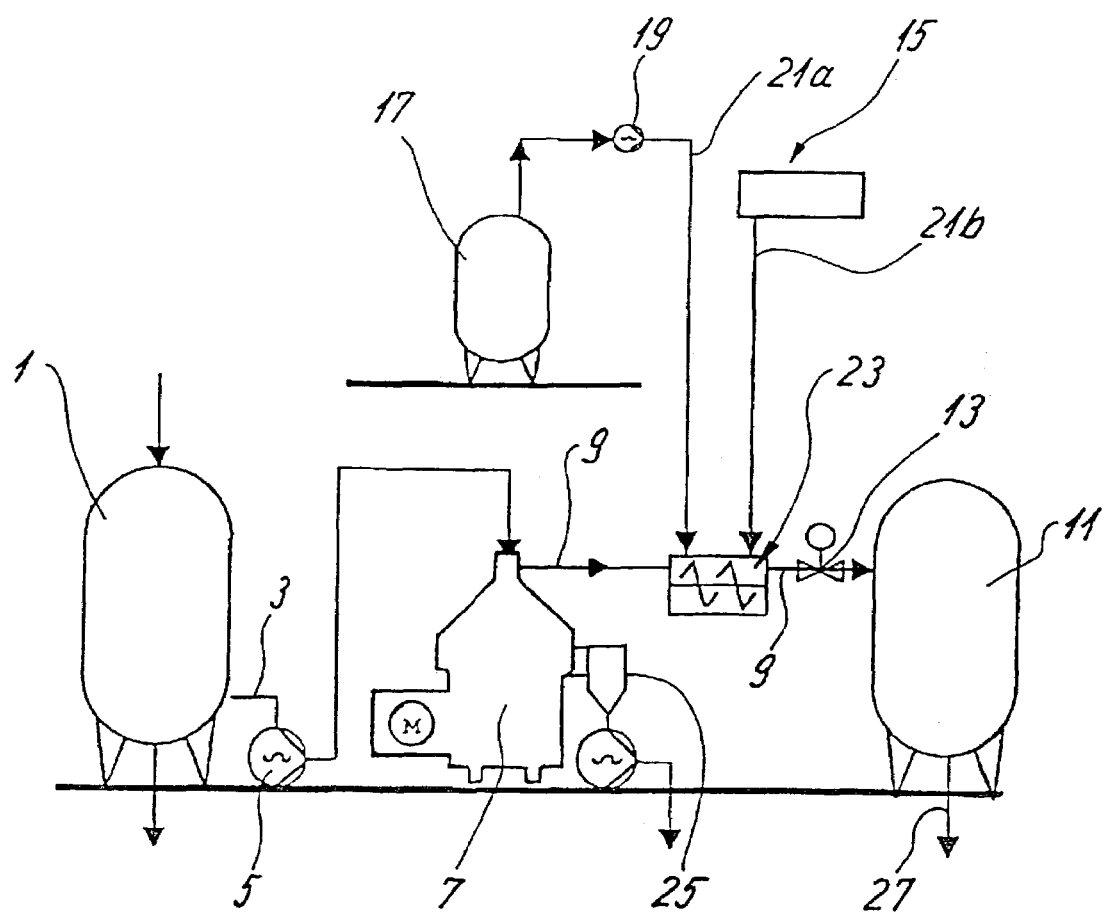
FIG. 1 is a schematic of a system having a separating device according to the present invention.

According to FIG. 1, must is guided (pumped) from a tank 1 by way of a pipe 3 by means of a pump 5 into a clarification separator 7, where a clarification of the must takes place in a centrifugal field. Solids are discharged from the clarification separator 7 by way of the solids throughput 25.

The must clarified in the clarification separator 7 is guided by way of a discharge 9 into a relaxation tank 11 in front of which a constant pressure valve 13 is connected. A flotation device 15 leads into the discharge 9, which flotation device 15 permits the proportioned feeding of air and/or gelatin into a discharge area directly in front of the constant pressure valve 13. The flotation device may comprise a gelatin tank 17 from which, by way of a pump 19 and pipe 21a and a mixer 23, the gelatin and/or, by way of additional pipe 21b and by way of the mixer 23, gas, such as air, and/or other substances can be introduced into the discharge 9. The feeding of the air and of the gelatin into the discharge 9 preferably takes place by way of a static mixer 23.

During the flotation process, 1 to 4 g/hl gelatin, preferably 2 to 3 g/hl, and 60–70 l/m$^3$ air, are added to the must. Additives other than gas and gelatin may be used.

From the relaxation tank 11, the must may be drained off in a downward direction through a pipe 27 so that any foam developing above a separation layer, formed in the tank 111 after flotation, remains in the tank 11.

The foam, which forms and rises as a result of the relaxation in the tank 11, is absolutely stable because of floated solids. The foam forms a clear separation layer with respect to a clear phase, so that the separation of any cloudiness from the clear must at the end of the discharge 9 is possible virtually "precisely to a point". The stable foam, which remains in the tank 11, is flushed out because the cloudiness is so dry that another processing of the cloudiness is not necessary. The clear phase can be withdrawn in a clean manner from the clear separation layer.

Figure 2:
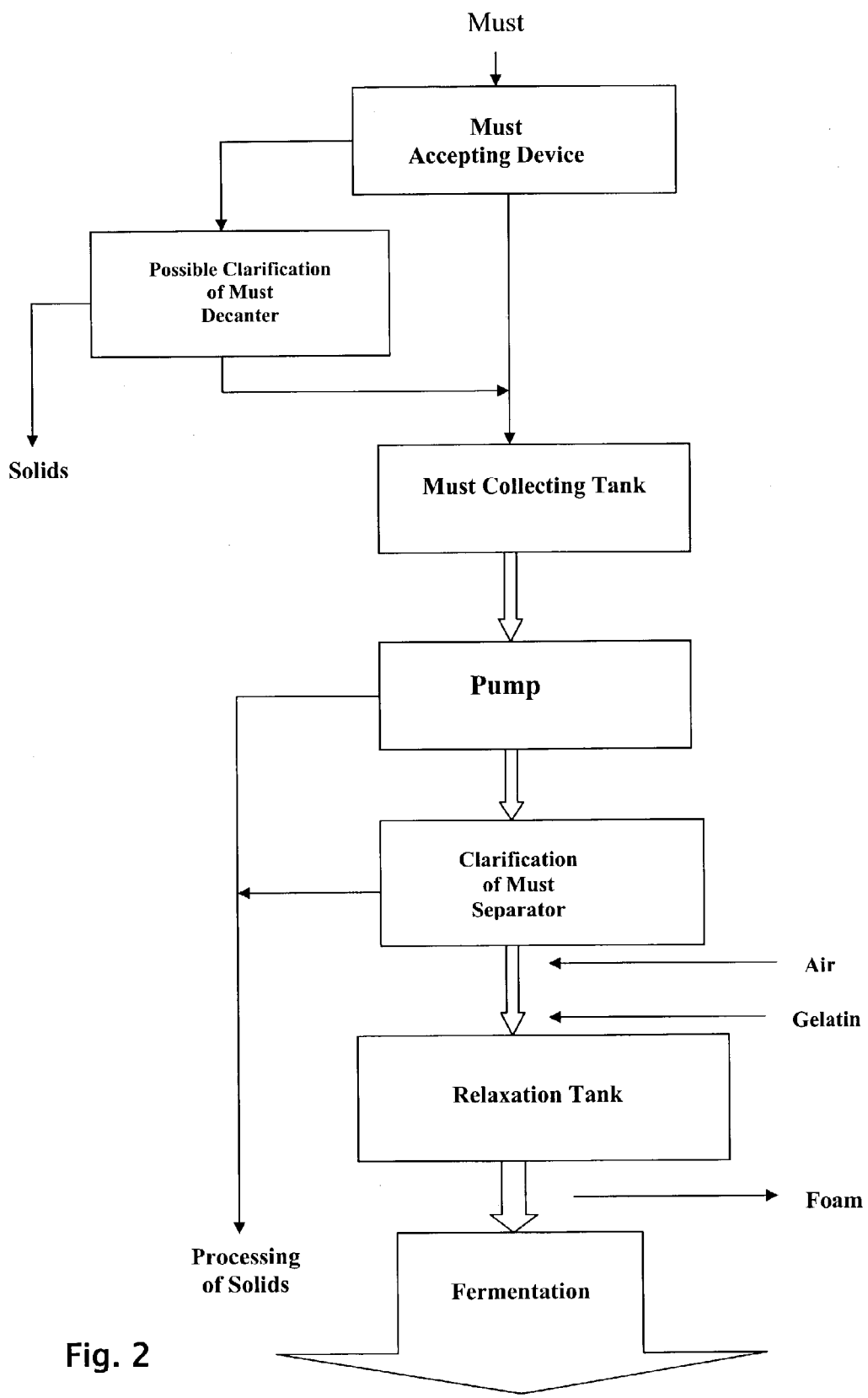
FIG. 2 is a flow chart of the steps for the clarification of must during the production of wine utilizing the system of FIG. 1.

FIG. 2 illustrates the method of clarifying must during the production of wine according to the present invention.

The method steps comprise: collecting must in a tank 1; feeding the must through a pump 5 into a separator 7; clarifying the must in the separator 7; discharging the clarified must through a discharge line 9; flotating the clarified must via a flotating device 15 by mixing the clarified must with one or more of gelatin and air; passing the flotated must through a constant pressure valve 13 into a relaxation device 11.

Optionally, a step for preclarification of the must can be implemented by means of a decanter. The solids drained off from the decanter and/or a pump and/or the separator may be separately processed and/or disposed of.

Although the present invention has been described and illustrated in detail, it is to be clearly understood that this is done by way of illustration and example only and is not to be taken by way of limitation. The spirit and scope of the present invention are to be limited only by the terms of the appended claims.

The invention claimed is:

1. A centrifugal separating device for the clarification of must in the production of wine, comprising:
   a centrifugal separator including a discharge;
   a valve to maintain a constant pressure and connected to the discharge; and;
   a flotation device connected between the discharge and the constant pressure valve.

2. The separating device according to claim 1, wherein the flotation device has a mixer for feeding one or more of a gas and gelatin into the clarified must from the separating device.

3. The separating device according to claim 2, wherein the mixer is a static mixer.

4. The separating device according to claim 2, wherein the flotation device is constructed as a direct pipe feeder into the discharge.

* * * * *